(12) United States Patent
Chen

(10) Patent No.: US 11,449,614 B2
(45) Date of Patent: Sep. 20, 2022

(54) COMPUTER SYSTEM AND ELECTRONIC APPARATUS HAVING SECURE BOOT MECHANISM AND OPERATION STATUS RESTORING METHOD THEREOF

(71) Applicant: REALTEK SEMICONDUCTOR CORPORATION, Hsinchu (TW)

(72) Inventor: Yi-Ruei Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/341,427

(22) Filed: Jun. 8, 2021

(65) Prior Publication Data

US 2022/0067167 A1 Mar. 3, 2022

(30) Foreign Application Priority Data

Aug. 25, 2020 (TW) .................................. 109128963

(51) Int. Cl.
*G06F 21/57* (2013.01)
*G06F 1/3234* (2019.01)
(Continued)

(52) U.S. Cl.
CPC .......... *G06F 21/575* (2013.01); *G06F 1/3234* (2013.01); *G06F 13/4068* (2013.01);
(Continued)

(58) Field of Classification Search
CPC ...... G06F 3/065; G06F 1/3287; G06F 9/4401; G06F 1/3203; G06F 21/575; G06F 11/1446; G06F 9/4418; G06F 21/64; H04L 9/3236
(Continued)

(56) References Cited

U.S. PATENT DOCUMENTS

| | | |
|---|---|---|
| 9,098,301 B2 | 8/2015 | Li et al. |
| 9,292,300 B2 | 3/2016 | Huang et al. |

(Continued)

FOREIGN PATENT DOCUMENTS

| | | |
|---|---|---|
| TW | I489315 | 6/2015 |
| TW | I493460 | 7/2015 |

OTHER PUBLICATIONS

OA letter of the counterpart TW application (appl. no. 109128963) dated Apr. 15, 2021. Summary of the OA letter: 1. Claims 1, 4-5 and 8-10 include terms that are not clearly defined and requires modification. 2. Claims 1-4, 8 and 10 are rejected as being unpatentable over the disclosure of the cited reference 1 (TW I489315, also published as US9292300B2), in view of the cited reference 2 (TW I493460, also published as US9098301B2). 3. Claims 6 and 7 are allowable.

*Primary Examiner* — Ji H Bae
(74) *Attorney, Agent, or Firm* — WPAT, PC

(57) ABSTRACT

The present invention discloses an electronic apparatus having secure boot mechanism. The processing circuit executes steps outlined below. Operation-related data is stored in the storage circuit under a normal operation mode. The operation related data is stored in a host terminal. A first hash value is calculated according to the operation related data and is stored in a non-power-off area. A power of the non-power-off area is maintained to be turned on and a power of a power-off area is turned off under a lower power operation mode. The power is restored when the normal operation mode is restored and the operation related data is retrieved from the host terminal to calculate a second hash value. The first and the second hash values are compared such that the operation related data is determined to be valid and the electronic apparatus operates according to the operation related data when the first and the second hash values are matched. The operation related data is determined to be (Continued)

invalid and the electronic apparatus stops to operate when the first and the second hash values are not matched.

20 Claims, 2 Drawing Sheets

(51) Int. Cl.
    *G06F 13/40*     (2006.01)
    *H04L 9/32*     (2006.01)
    *G06F 9/4401*     (2018.01)
    *G06F 1/3203*     (2019.01)
    *G06F 11/14*     (2006.01)
    *G06F 3/06*     (2006.01)
    *G06F 1/3287*     (2019.01)
    *G06F 21/64*     (2013.01)

(52) U.S. Cl.
    CPC .......... *G06F 21/572* (2013.01); *H04L 9/3236* (2013.01); *G06F 1/3203* (2013.01); *G06F 1/3287* (2013.01); *G06F 3/065* (2013.01); *G06F 9/4401* (2013.01); *G06F 9/4418* (2013.01); *G06F 11/1446* (2013.01); *G06F 21/64* (2013.01); *G06F 2221/033* (2013.01)

(58) Field of Classification Search
    USPC .............. 713/2, 323, 324; 711/162; 714/819
    See application file for complete search history.

(56) References Cited

U.S. PATENT DOCUMENTS

| | | | | |
|---|---|---|---|---|
| 2014/0325197 | A1* | 10/2014 | Lewis | G06F 9/4418 713/2 |
| 2015/0242141 | A1* | 8/2015 | Kuo | G06F 3/0688 713/193 |
| 2019/0042765 | A1* | 2/2019 | Chung | G06F 21/602 |
| 2020/0250348 | A1* | 8/2020 | Hamlin | G06F 21/81 |
| 2022/0058295 | A1* | 2/2022 | Boehm | G06F 21/602 |

* cited by examiner

COMPUTER SYSTEM AND ELECTRONIC APPARATUS HAVING SECURE BOOT MECHANISM AND OPERATION STATUS RESTORING METHOD THEREOF

BACKGROUND OF THE INVENTION

1. Field of the Invention

The present invention relates to a computer system and an electronic apparatus having secure boot mechanism and an operation status restoring method thereof.

2. Description of Related Art

In a computer system, a host is coupled to a multiple of peripheral electronic apparatus. In order to save power, these peripheral electronic apparatus may switch to a lower power operation mode from a normal operation mode to turn off as many circuits therein as possible.

When the normal operation is required to performed, the peripheral electronic apparatus usually stores data required in the operation (e.g. complete firmware or other parameters) in an internal memory, in order to be quickly switched back to the normal operation mode. Further, when the normal operation mode is restored, the peripheral electronic apparatus has to perform secure boot verification on the firmware. However, the storage of the firmware takes a larger size of memory that needs to maintain power and the verification of the firmware is time-consuming and power-consuming. As a result, the peripheral electronic apparatus can not save the power efficiently and can not restore to the normal operation mode quickly.

SUMMARY OF THE INVENTION

In consideration of the problem of the prior art, an object of the present invention is to supply a computer system and an electronic apparatus having secure boot mechanism and an operation status restoring method thereof.

The present invention discloses an electronic apparatus having a secure boot mechanism electrically coupled to a host terminal. The electronic apparatus includes a storage circuit and a processing circuit. The processing circuit is configured to execute steps outlined below. Operation-related data is stored in the storage circuit under a normal operation mode. The operation-related data is stored in the host terminal. A first hash value is calculated according to the operation-related data and the first hash value is stored in a non-power-off area of the storage circuit. A power of the non-power-off area is maintained to be turned on and turning off the power of a power-off area when the electronic apparatus is switched to be under a lower power operation mode. The power of the power-off area is restored and the operation-related data is retrieved from the host terminal to the storage circuit to calculate a second hash value accordingly when the electronic apparatus is switched back to be under the normal operation mode. The first hash value and the second hash value are compared such that the operation-related data is determined to be valid and the electronic apparatus operates according to the retrieved operation-related data when the first hash value and the second hash value are matched, and the operation-related data is determined to be invalid and the electronic apparatus stops to operate when the first hash value and the second hash value are not matched.

The present invention also discloses a computer system that includes a host terminal and an electronic apparatus. The electronic apparatus has a secure boot mechanism and is electrically coupled to the host terminal. The electronic apparatus includes a storage circuit and a processing circuit. The processing circuit is configured to execute steps outlined below. Operation-related data is stored in the storage circuit under a normal operation mode of the electronic apparatus. The operation-related data is stored in the host terminal. A first hash value is calculated according to the operation-related data and the first hash value is stored in a non-power-off area of the storage circuit. A power of the non-power-off area is maintained to be turned on and turning off the power of a power-off area when the electronic apparatus is switched to be under a lower power operation mode. The power of the power-off area is restored and the operation-related data is retrieved from the host terminal to the storage circuit to calculate a second hash value accordingly when the electronic apparatus is switched back to be under the normal operation mode. The first hash value and the second hash value are compared such that the operation-related data is determined to be valid and the electronic apparatus operates according to the retrieved operation-related data when the first hash value and the second hash value are matched, and the operation-related data is determined to be invalid and the electronic apparatus stops to operate when the first hash value and the second hash value are not matched.

The present invention also discloses an operation status restoring method having a secure boot mechanism used in an electronic apparatus electrically coupled to a host terminal. The operation status restoring method includes the steps outlined below. Operation-related data is stored in a storage circuit under a normal operation mode of the electronic apparatus by a processing circuit. Operation-related data is stored in the host terminal by the processing circuit. A first hash value is calculated according to the operation-related data and storing the first hash value in a non-power-off area of the storage circuit by the processing circuit. A power of the non-power-off area is maintained to be turned on and the power of a power-off area is turned off when the electronic apparatus is switched to be under a lower power operation mode by the processing circuit. The power of the power-off area is restored and the operation-related data is retrieved from the host terminal to the storage circuit to calculate a second hash value accordingly when the electronic apparatus is switched back to be under the normal operation mode by the processing circuit. The first hash value and the second hash value are compared by the processing circuit such that the operation-related data is determined to be valid and the electronic apparatus operates according to the retrieved operation-related data when the first hash value and the second hash value are matched, and the operation-related data is determined to be invalid and the electronic apparatus stops to operate when the first hash value and the second hash value are not matched.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a computer system and an electronic apparatus having secure boot mechanism and an operation status restoring method thereof to only store a first hash value (hash digest value) with extremely low power consumption under a lower power operation mode and retrieve operation-related data from a host terminal when a normal operation mode is restored to perform calculation to generate a second hash value. The first hash value and the second hash value can be compared to perform verification to accomplish a secure boot mechanism.

Figure 1:
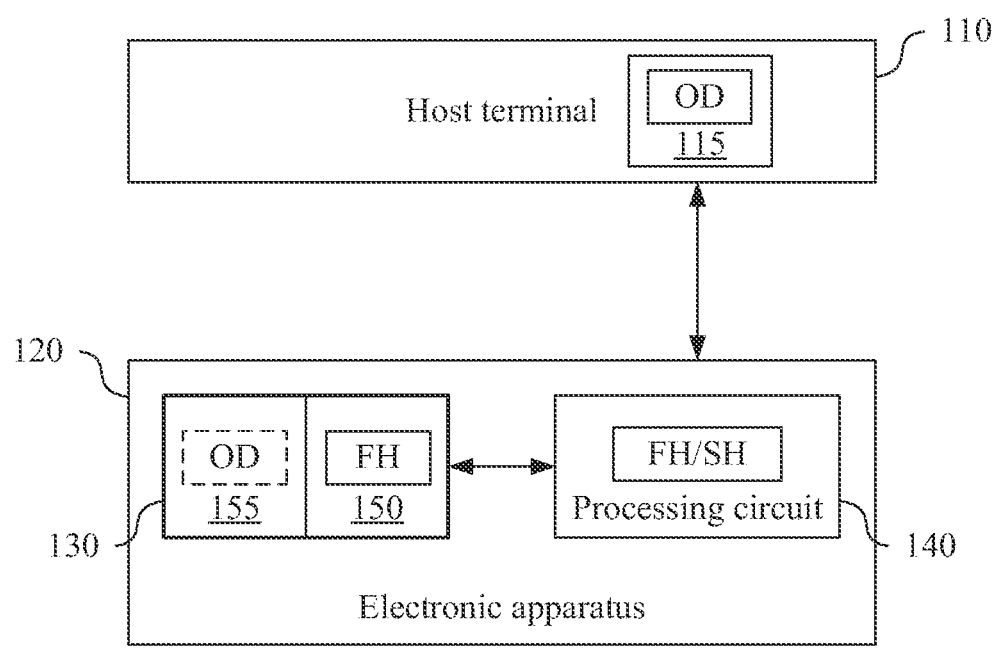
FIG. 1 illustrates a block diagram of a computer system according to an embodiment of the present invention.

Reference is now made to FIG. 1. FIG. 1 illustrates a block diagram of a computer system 100 according to an embodiment of the present invention. The computer system 100 includes a host terminal 110 and an electronic apparatus 120 having a secure boot mechanism.

The electronic apparatus 120 is electrically coupled to the host terminal 110. In an embodiment, the electronic apparatus 120 is a peripheral electronic apparatus to the host terminal 110 and is able to perform data transmission with the host terminal 110 by using a transmission interface (such as but not limited to a bus, not illustrated in the figure).

Based on the above description, the electronic apparatus 120 operates under an initial operation mode when the electronic apparatus 120 begins to operate to perform initialization. After the initialization, the electronic apparatus 120 operates under a normal operation mode. Further, when power-saving is required, the electronic apparatus 120 can switch from the normal operation mode to a lower power operation mode. When the normal operation is required, the electronic apparatus 120 can switch back to the normal operation mode from the lower power operation mode.

The electronic apparatus 120 includes a storage circuit 130 and a processing circuit 140. The processing circuit 140 is electrically coupled to the storage circuit 130.

In an embodiment, the storage circuit 130 can be such as, but not limited to a static random access memory (SRAM) and includes a non-power-off area 150 and a power-off area 155. Under the normal operation mode described above, the non-power-off area 150 and the power-off area 155 of the storage circuit 130 are powered normally. Under the lower power operation mode described above, only the power of the non-power-off area 150 is maintained while the power of the power-off area 155 is turned off in order to save power.

In an embodiment, the processing circuit 140 is configured to store at least operation-related data OD in the storage circuit 130 under the normal operation mode of the electronic apparatus 120. In an embodiment, the operation-related data OD is stored in the power-off area 155. Since the data is lost when the power of the power-off area 155 is turned off, the operation-related data OD stored in the power-off area 155 is illustrated as a dashed-line frame in FIG. 1. The operation-related data OD includes such as, but not limited to firmware related data, memory data, register data or a combination thereof. The firmware related data includes at least one firmware command and at least one firmware operation parameter.

The processing circuit 140 is further configured to store the operation-related data OD in the host terminal 110. In an embodiment, the processing circuit 140 transmits the operation-related data OD through the transmission interface to the host terminal 110 such that the host terminal 110 stores the operation-related data OD in a corresponding memory 115 of the host terminal 110. Physically, the memory 115 can be disposed in the host terminal 110 or outside of the host terminal 110 and electrically coupled thereto.

It is appreciated that, the memory 115 of the host terminal 110 used to store the operation-related data OD is a non-power-off memory and can be accessed any time. As a result, the operation-related data OD stored in the host terminal 110 is illustrated as a solid-line frame in FIG. 1.

The processing circuit 140 is further configured to calculate at least one first hash value FH according to the operation-related data OD and store the first hash value FH in the non-power-off area 150 of the storage circuit 130.

In an embodiment, the processing circuit 140 can calculate a corresponding hash value for each of different contents included in the operation-related data OD. For example, the operation-related data OD may include such as, but not limited to firmware related data, and the firmware related data may include at least one firmware command and at least one firmware operation parameter. As a result, the first hash value FH may correspondingly include a command hash value an operation parameter hash value.

In an embodiment, the operation-related data OD may include memory data, register data or a combination thereof. As a result, the first hash value FH may correspondingly include a memory data hash value, a register data hash value or a combination thereof.

In an embodiment, corresponding to the different contents described above, each of the corresponding hash value generated by the processing circuit 140 may have such as, but not limited to a length of 32 bits.

It is appreciated that the content included in the operation-related data OD, the corresponding number of the hash values and the bit number of the hash values described above are merely an example. The present invention is not limited thereto.

The time of the generation of the operation-related data OD and the first hash value FH may be different due to different application requirements.

In an embodiment, the processing circuit 140 keeps generating the operation-related data OD under the normal operation mode.

Under such a condition, in an embodiment, the processing circuit 140 calculates the first hash value FH according to the operation-related data OD when a predetermined event occurs under the normal operation mode, such that the operation-related data OD and the first hash value FH are respectively stored in the host terminal 110 and the storage circuit 130. The predetermined event occurs when the electronic apparatus 120 is switched to be under the lower power operation mode.

In another embodiment, the processing circuit 140 calculates the first hash value FH according to the operation-related data OD when a predetermined period is met under the normal operation mode, such that the operation-related data OD and the first hash value FH are respectively stored in the host terminal 110 and the storage circuit 130.

In yet another embodiment, the processing circuit 140 generates the operation-related data OD and the first hash value FH under the initial operation mode of the electronic apparatus 120. The processing circuit 140 stores the operation-related data OD and the first hash value FH respectively in the host terminal 110 and the storage circuit 130.

When the electronic apparatus 120 switches to be under the lower power operation mode, the processing circuit 140 maintains the power of the non-power-off area 150 and turns off the power of the power-off area 155 in the storage circuit 130. As a result, the first hash value FH is not lost since the first hash value FH is stored in the non-power-off area 150. The operation-related data OD is lost since the power of the power-off area 155 is turned off.

In an embodiment, a size of the non-power-off area 150 is only used to store the first hash value FH such that the size of the non-power-off area 150 can be as small as possible. As a result, the power consumption of the storage circuit 130 can be as small as possible under the lower power operation mode. In other embodiments, the non-power-off area 150 may store other parameters besides the first hash value FH.

When the electronic apparatus 120 is restored to the normal operation mode, the processing circuit 140 restores the power of the power-off area 155, retrieves the operation-related data OD from the host terminal 110 to the storage circuit 130 and calculates a second hash value SH accordingly.

The processing circuit 140 compares the first hash value FH and the second hash value SH. The operation-related data OD is determined to be valid and the electronic apparatus 120 operates according to the retrieved operation-related data OD when the first hash value FH and the second hash value SH are matched.

On the contrary, the operation-related data OD is determined to be invalid and the electronic apparatus 120 stops to operate when the first hash value FH and the second hash value SH are not matched since the operation-related data OD retrieved from the host terminal 110 may be modified to cause information security issues.

As a result, the computer system and the electronic apparatus having the secure boot mechanism of the present invention can store the operation-related data in the host terminal such that the storage circuit in the electronic apparatus only needs to maintain an extremely low power consumption under the lower power operation mode to store the first hash value generated based on the calculation of the operation-related data. When the normal operation mode is restored, the electronic apparatus compares the first hash value with the second hash value calculated according to the operation-related data retrieved from the host terminal to perform verification to accomplish the secure boot mechanism.

Figure 2:
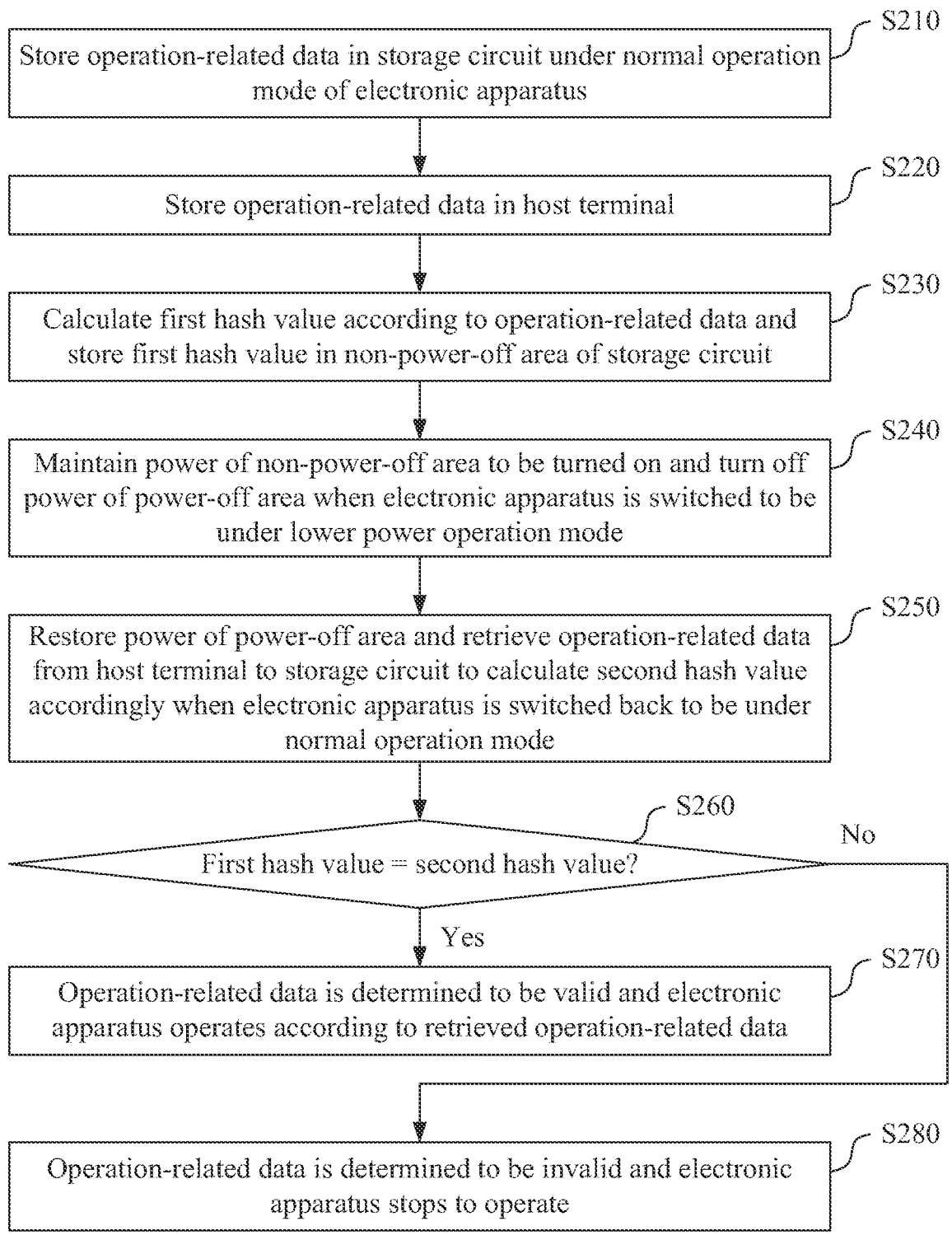
FIG. 2 illustrates a flow chart of an operation status restoring method according to an embodiment of the present invention.

Reference is now made to FIG. 2. FIG. 2 illustrates a flow chart of an operation status restoring method 200 according to an embodiment of the present invention.

Besides the apparatus described above, the present invention further discloses the operation status restoring method 200 that can be used in such as, but not limited to, the electronic apparatus 120 illustrated in FIG. 1. The processing circuit 140 of the electronic apparatus 120 can retrieve and execute computer executable commands (not illustrated in the figure) to execute the operation status restoring method 200. An embodiment of the operation status restoring method 200 is illustrated in FIG. 2 and includes the steps S210-S280 outlined below.

In step S210, the operation-related data OD is stored in the storage circuit 130 under the normal operation mode of the electronic apparatus 120 by the processing circuit 140.

In step S220, the operation-related data OD is stored in the host terminal 110 by the processing circuit 140.

In step S230, the first hash value FH is calculated according to the operation-related data OD and the first hash value FH is stored in the non-power-off area 150 of the storage circuit 130 by the processing circuit 140.

In step S240, the power of the non-power-off area 150 is maintained to be turned on, and the power of the power-off area 155 is turned off when the electronic apparatus 120 is switched to be under the lower power operation mode by the processing circuit 140.

In step S250, the power of the power-off area 155 is restored and the operation-related data OD is retrieved from the host terminal 110 to the storage circuit 130 to calculate the second hash value SH accordingly when the electronic apparatus 120 is switched back to be under the normal operation mode by the processing circuit 140

In step S260, the first hash value FH and the second hash value SH are compared by the processing circuit 140 to determine whether the first hash value FH and the second hash value SH are matched.

In step S270, the operation-related data OD is determined to be valid by the processing circuit 140, and the electronic apparatus 120 operates according to the retrieved operation-related data OD when the first hash value FH and the second hash value SH are matched.

In step S280, the operation-related data OD is determined to be invalid by the processing circuit 140, and the electronic apparatus 120 stops to operate when the first hash value FH and the second hash value SH are not matched.

It is appreciated that the embodiments described above are merely an example. In other embodiments, it should be appreciated that many modifications and changes may be made by those of ordinary skill in the art without departing from the spirit of the invention.

In summary, the computer system and the electronic apparatus having secure boot mechanism and the operation status restoring method thereof of the present invention can store the operation-related data in the host terminal such that the storage circuit in the electronic apparatus only needs to maintain an extremely low power consumption under the lower power operation mode to store the first hash value generated based on the calculation of the operation-related data. When the normal operation mode is restored, the electronic apparatus compares the first hash value with the second hash value calculated according to the operation-related data retrieved from the host terminal to perform verification to accomplish the secure boot mechanism.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An electronic apparatus having a secure boot mechanism electrically coupled to a host terminal, the electronic apparatus comprising:
   a storage circuit; and
   a processing circuit electrically coupled to the storage circuit, the processing circuit configured to:
      store operation-related data in the storage circuit under a normal operation mode;
      store the operation-related data in the host terminal;
      calculate a first hash value according to the operation-related data and store the first hash value in a non-power-off area of the storage circuit;
      maintain a power of the non-power-off area to be turned on and turn off the power of a power-off area when the electronic apparatus is switched to be under a lower power operation mode;

restore the power of the power-off area and retrieve the operation-related data from the host terminal to the storage circuit to calculate a second hash value accordingly when the electronic apparatus is switched back to be under the normal operation mode; and compare the first hash value and the second hash value such that the operation-related data is determined to be valid and the electronic apparatus operates according to the retrieved operation-related data when the first hash value and the second hash value are matched, and the operation-related data is determined to be invalid and the electronic apparatus stops to operate when the first hash value and the second hash value are not matched.

2. The electronic apparatus of claim 1, wherein the operation-related data comprises firmware related data comprising at least one firmware command and at least one firmware operation parameter, and the first hash value comprises a corresponding command hash value and a corresponding operation parameter hash value.

3. The electronic apparatus of claim 1, wherein the operation-related data comprises memory data, register data or a combination thereof, and the first hash value comprises a memory data hash value, a register data hash value or a combination thereof.

4. The electronic apparatus of claim 1, wherein a size of the non-power-off area of the storage circuit is minimized such that the non-power-off area is only used to store the first hash value.

5. The electronic apparatus of claim 1, wherein the processing circuit further configured to:
keep generating the operation-related data under the normal operation mode; and
calculate the first hash value according to the operation-related data when a predetermined event occurs or when a predetermined period is met such that the operation-related data and the first hash value are respectively stored in the host terminal and the storage circuit.

6. The electronic apparatus of claim 5, wherein the predetermined event occurs when the electronic apparatus is switched to be under the lower power operation mode.

7. The electronic apparatus of claim 1, wherein the processing circuit further configured to:
generate the operation-related data and the first hash value under an initial operation mode of the electronic apparatus; and
store the operation-related data and the first hash value respectively in the host terminal and the storage circuit.

8. The electronic apparatus of claim 1, wherein the storage circuit is a static random access memory (SRAM).

9. A computer system, comprising:
a host terminal; and
an electronic apparatus having a secure boot mechanism electrically coupled to the host terminal and comprising:
a storage circuit; and
a processing circuit electrically coupled to the storage circuit, the processing circuit configured to:
store operation-related data in the storage circuit under a normal operation mode of the electronic apparatus;
store the operation-related data in the host terminal;
calculate a first hash value according to the operation-related data and store the first hash value in a non-power-off area of the storage circuit;

maintain a power of the non-power-off area to be turned on and turn off the power of a power-off area when the electronic apparatus is switched to be under a lower power operation mode;

restore the power of the power-off area and retrieve the operation-related data from the host terminal to the storage circuit to calculate a second hash value accordingly when the electronic apparatus is switched back to be under the normal operation mode; and compare the first hash value and the second hash value such that the operation-related data is determined to be valid and the electronic apparatus operates according to the retrieved operation-related data when the first hash value and the second hash value are matched, and the operation-related data is determined to be invalid and the electronic apparatus stops to operate when the first hash value and the second hash value are not matched.

10. The computer system of claim 9, wherein the operation-related data comprises firmware related data comprising at least one firmware command and at least one firmware operation parameter, and the first hash value comprises a corresponding command hash value and a corresponding operation parameter hash value.

11. The computer system of claim 9, wherein the operation-related data comprises memory data, register data or a combination thereof, and the first hash value comprises a memory data hash value, a register data hash value or a combination thereof.

12. The computer system of claim 9, wherein a size of the non-power-off area of the storage circuit is minimized such that the non-power-off area is only used to store the first hash value.

13. The computer system of claim 9, wherein the processing circuit further configured to:
keep generating the operation-related data under the normal operation mode; and
calculate the first hash value according to the operation-related data when a predetermined event occurs or when a predetermined period is met such that the operation-related data and the first hash value are respectively stored in the host terminal and the storage circuit.

14. The computer system of claim 13, wherein the predetermined event occurs when the electronic apparatus is switched to be under the lower power operation mode.

15. The computer system of claim 9, wherein the processing circuit further configured to:
generate the operation-related data and the first hash value under an initial operation mode of the electronic apparatus; and
store the operation-related data and the first hash value respectively in the host terminal and the storage circuit.

16. An operation status restoring method having a secure boot mechanism used in an electronic apparatus electrically coupled to a host terminal, the operation status restoring method comprising:
storing operation-related data in a storage circuit under a normal operation mode of the electronic apparatus by a processing circuit;
storing the operation-related data in the host terminal by the processing circuit;
calculating a first hash value according to the operation-related data and storing the first hash value in a non-power-off area of the storage circuit by the processing circuit;

maintaining a power of the non-power-off area to be turned on and turning off the power of a power-off area when the electronic apparatus is switched to be under a lower power operation mode by the processing circuit;

restoring the power of the power-off area and retrieving the operation-related data from the host terminal to the storage circuit to calculate a second hash value accordingly when the electronic apparatus is switched back to be under the normal operation mode by the processing circuit; and comparing the first hash value and the second hash value by the processing circuit such that the operation-related data is determined to be valid and the electronic apparatus operates according to the retrieved operation-related data when the first hash value and the second hash value are matched, and the operation-related data is determined to be invalid and the electronic apparatus stops to operate when the first hash value and the second hash value are not matched.

17. The operation status restoring method of claim 16, wherein a size of the non-power-off area of the storage circuit is minimized such that the non-power-off area is only used to store the first hash value.

18. The operation status restoring method of claim 16, further comprising:

keeping generating the operation-related data under the normal operation mode; and calculating the first hash value according to the operation-related data when a predetermined event occurs or when a predetermined period is met such that the operation-related data and the first hash value are respectively stored in the host terminal and the storage circuit.

19. The operation status restoring method of claim 18, wherein the predetermined event occurs when the electronic apparatus is switched to be under the lower power operation mode.

20. The operation status restoring method of claim 16, further comprising: generating the operation-related data and the first hash value under an initial operation mode of the electronic apparatus; and storing the operation-related data and the first hash value respectively in the host terminal and the storage circuit.

* * * * *